Dec. 12, 1972 H. KNITTER ET AL 3,706,065

ELECTRIC CONTACT ARRANGEMENT

Filed June 18, 1971

United States Patent Office 3,706,065

Patented Dec. 12, 1972

3,706,065
ELECTRIC CONTACT ARRANGEMENT

Heinz Knitter, Heilbronn, and Paul Sorg, Fuerfeld, Germany, assignors to The Bunker-Ramo Corporation, Oak Brook, Ill.

Filed June 18, 1971, Ser. No. 154,394
Claims priority, application Germany, July 24, 1970, P 20 36 829.0
Int. Cl. H05k *1/02*
U.S. Cl. 339—17 LC 12 Claims

ABSTRACT OF THE DISCLOSURE

This invention relates to a plurality of electrical contacts coupled to a non-conductive carrier board. The electrical contacts have a contact surface exposed on at least one surface of the carrier board and have another surface for connecting the electrical contacts to conducting paths on the carrier board. A protective barrier strip is attached to the carrier board at a location between the contact surfaces and the connecting surfaces. The protecting barrier strip protects the contact surfaces from exposure to damage by solder and flux or other materials used when the connecting surfaces are joined to the conducting paths.

BACKGROUND OF THE INVENTION

(1) Field of the invention

This invention pertains to the field of electrical contacts of the plug and socket type, particularly for use with printed circuits where the plug part of the connector includes a printed circuit.

(2) Description of the prior art

Printed circuits are frequently provided on a carrier board which is an integral part of a plug connector. When the paths of the printed circuit are joined to the connecting surface of the contact strips, solder and flux often flow from the connection onto the contact surfaces of the contacts. The presence of these contaminants on the contact surfaces make it difficult to obtain a reliable contact with the mating receptacle. The contact surfaces must be cleaned after soldering. Cleaning of the contact surfaces to remove solder and flux is a difficult operation which increases the cost of the part. The prior art is devoid of a reliable means of preventing such solder and flux contamination.

SUMMARY OF THE INVENTION

An object of the present invention is to provide an improved electrical contact arrangement which can be economically fabricated and which provides reliable contact surfaces for a carrier board.

Another object of the invention is to provide an electrical contact arrangement for a carrier board having a barrier between the contact surfaces and the connection which joins the contacts to a conducting path to protect the contact surfaces from damage by solder, flux, or other contaminants resulting from the connecting process.

A further object of the invention is to provide electrical contacts having improved configurations so as to facilitate their assembly on a carrier board and their connection to a conducting path.

The invention provides a means for preventing contamination of the contact surfaces with materials such as solder and flux which are used in connecting the contacts to conducting paths of a carrier plate. A protective barrier strip is provided between the contact surface and the connecting surface. This protective strip abuts, at least partially, against the carrier plate and the contacts to form a barrier preventing the flow of solder and flux onto the contact surfaces.

Since the protecting strip protects the contact surfaces from exposure to contaminants during the joining or soldering operation, the difficult cleaning operation previously required is unnecessary.

The protective strip need not provide a continuous barrier between the connecting surfaces and the contact surfaces, but it must form a sufficient barrier to seal off all the known paths of solder and flux flow. When contact surfaces are provided on both sides of a carrier board, it is desirable to have a protective strip on both sides of the carrier board. The contact surfaces on both sides of the carrier board are thereby protected from exposure to solder and flux.

The protective strip may be constructed so that a portion serves as a holding strip to mechanically fasten the contacts to the carrier plate. In this case, at least one edge of the protective strip is constructed as a seal or packing part to protect the contact surfaces. The seal edge may be formed by ultrasonic wedging, heat wedging, or cold wedging, either before or after the protective strip is mounted to the carrier board.

The contacts may be stamped out of sheet metal and then folded near the center, thus forming two rearward extensions for connecting the contacts to conducting paths on the carrier board. When the rearward extensions of such contacts are not parallel, it is difficult to insert them into a corresponding opening leading to the conducting path to which they are subsequently joined. Also, if these connecting extensions are not parallel, a poor soldering joint is obtained, since the solder will join the strips in several locations where the strips are close together.

The connecting extensions of the contacts can be stiffened yet remain small in cross section by intentional deformation. Such stiffened extensions can be maintained parallel and are easily introduced into small openings in the carrier plate. In this manner, corresponding openings in the carrier plate can be made very small, so that the connecting extensions lie close to one another, and a better solder joint is obtained.

A particularly simple and advantageous intentional deformation consists of forming the contact connecting extensions into a V-shaped cross-section.

The connecting extensions of the contact strip may be joined to each other to assure that they are maintained parallel with one another. The connecting extensions may be joined by twisting them together to form a helix or spiral. In another embodiment, one of the two ends of the connecting extensions can be constructed longer than the other, and this prolongation can be folded back upon the other end, thus joining the ends.

Further features and advantages of the invention are shown in the following drawings and description of the preferred embodiments.

DESCRIPTION OF THE PREFERRED EMBODIMENTS

Figures 1, 2, 3, 4, 5, 6, 7:
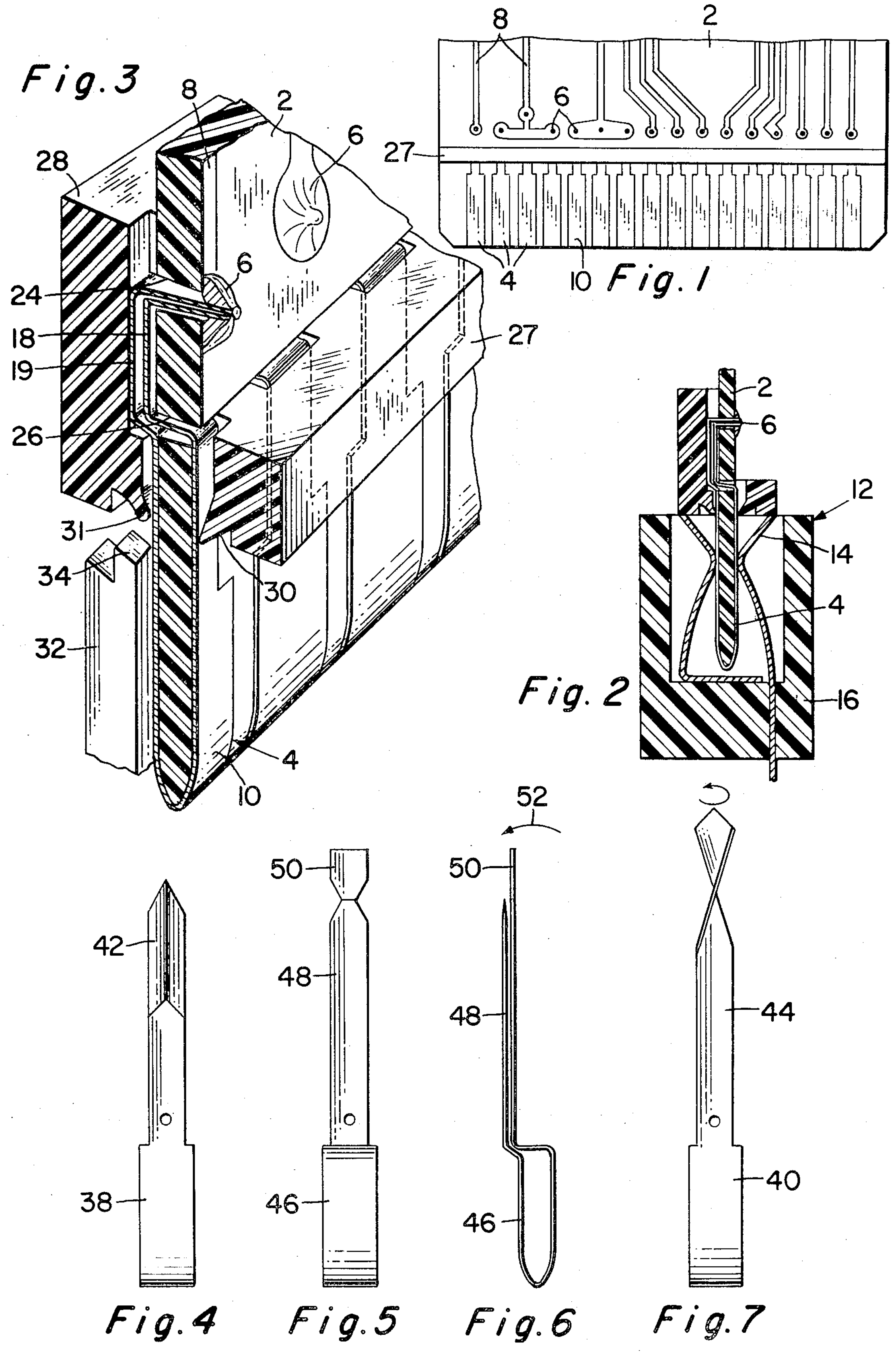
FIG. 1 is a plan views showing the contact arrangement on a plug part.
FIG. 2 is a cross-section through a connector assembly showing the plug part according to FIG. 1 inserted in a socket part.
FIG. 3 is a perspective view of the plug shown in FIG. 1 having protective strips on both sides of the plug.
FIG. 4 is a plan view of a first embodiment of a contact.
FIG. 5 is a plan view of a second embodiment of a contact.
FIG. 6 is a side elevation of the contact shown in FIG. 5.
FIG. 7 is a plan view of a third embodiment of a contact.

FIG. 1 shows the connecting portion of a carrier board 2 consisting of insulating material, for use with printed circuits. A series of electrically conducting contacts 4 are arranged on the carrier board 2. The rearward ends of the contacts are soldered to form a connection 6 with a conducting path 8 on the carrier board 2. The contact surfaces 10 on the front portion of the contacts 4 lie exposed on the carrier board, in a manner suitable for introduction into a socket part. The contacts are formed of strips of sheet metal which are bent around the lower edge of the carrier board 2 as shown in FIG. 3, and may lie on the exterior surface of board 2 or embedded flush within board 2.

FIG. 2 shows how the contacts 4 are introduced into a socket part 12 to form a connection. A forked-shaped electrically conducting socket contact 14 is provided for each individual contact 4. Socket contacts 14 are arranged adjacent to one another, and are held in a housing 16 of insulating material.

The construction and arrangement of one of the contacts 4 on the carrier board 2 is shown in FIG. 3. The ends of the rearward extensions 18, 19 of the contacts 4 are combined and soldered together to the connection 6 of the conductor path 8. One of the extensions is guided through an opening 26 in the carrier board 2, so that the two rearward extensions 18, 19 can be joined together and extended parallel through the opening 24 in the carrier board 2 leading to the connection 6.

A front protecting strip 27 and a rear protecting strip 28 are shown attached to the sides of the carrier board 2 between the connections 6 and the contact surfaces 10. Protecting strip 28 is shown extending over the area opposite connections 6. The protecting strips 27, 28 assist in holding contacts 4 in place, and have edges 30, 31 facing the contacts 4 and are formed so that they touch the contacts 4. Thereby flux or solder used during soldering of connections 6 cannot flow onto the contact surfaces 10 of the contacts 4. The edges 30, 31 of the protective strips 27, 28 need not press strongly against the contacts 4. A small space between the contacts 4 and the edges 30, 31 can be allowed since there is sufficient cooling in this area to stiffen the flux and solder thus preventing further flow.

The holding strips 27, 28 may be produced of synthetic materials such as polycarbonates or nylon and may be mounted on the carrier board 2 by any suitable means, such as bonding, or mechanical attachment by rivets or screws. The sealing edges 30, 31 may be formed while in a mounted condition on the carrier board 2 using a correspondingly constructed pressing implement and ultrasonic wedging, heat wedging, or cold wedging methods of flowing the material. Such a pressing tool 32 is shown on one side of the contact 4. The front side of the pressing tool is provided with an inclined cut step 34, which, upon being pressed into the protecting strip 28, squeezes the sealing edge 31 out of the strip.

The contacts described in FIGS. 1–3 are provided with two rearward extensions 18 and 19 whose ends are soldered in common forming a connection 6 with conducting path 8 on the carrier board 2. The rearward extensions are held together mechanically before soldering by the sides of the opening 24. Since the two rearward extensions 18, 19 consist of thin sheet metal, it is difficult to keep them parallel and guide them through opening 24. If the opening 24 is made large, the rearward extensions 18 and 19 can be guided through the opening 24 with less difficulty, but this leads to a poor solder joint with conducting path 8 since the two rearward extensions are not held closely together in one position and may separate during soldering. To overcome this problem, the rearward extensions can be formed so that they may be easily guided through an opening and are readily solderable, as shown in the three embodiments of FIGS. 4–7.

In FIG. 4, contact 38 is provided with rearward extension 42 having end portions bent into a V-shape. This deformation imparts a stiffness to the rearward portions 42, making them easy to align straight and parallel and easy to guide through an opening.

FIGS. 5 and 6 show a contact 46 having one rearward extension 50 which is prolonged past the other rearward extension 48. The prolongation of extension 50 may be folded back in the direction of arrow 52 about the rearward extension 48, whereby both extensions are connected together.

FIG. 7 shows a contact 40 having two rearward extensions 44 of equal length that are joined together by twisting them to form a helix or spiral.

This invention is not limited to the examples described, there being a great number of variations possible without departing from the spirit and scope of the invention. The protective strip between a soldering connection and a contact surface is not limited to configurations and locations shown in the preferred embodiment, but may be located wherever the possibility exists that flux or solder may flow from the soldering connection to the contact surfaces. Further, the protecting strip may be formed integrally with the carrier board, rather than being applied or mounted to a carrier board.

Thus, it is to be undestood that the invention is not limited to the specific embodiments described herein but is intended to be limited only by the appended claims.

The embodiments of the invention in which an exclusive property or privilege is claimed are defined as follows:

1. An electrical contact apparatus comprising:

a carrier board of non-conductive material having a conducting path thereon;

an electrical contact means coupled to said carrier board, having a contact surface exposed on at least one surface of said board and having a means for connecting said contact means to said conducting path; and means for protecting said contact surface coupled to said carrier board at a location between said contact surface and said means for connecting, whereby said contact surface is protected from damage when said means for connecting is joined to said conducting path.

2. The apparatus as claimed in claim 1, wherein said electrical contact means comprises an elongated strip of metal extending from one surface of said board over an edge of said board to the opposite surface of said board, one end of said strip extending through a first aperture in said board from said one surface to said opposite surface of said board where said one end follows adjacent to the other end of said strip, the end portions of both strips extending through a second aperture in said board from said opposite surface to said one surface where both ends of said strip are joined together to form said means for connecting.

3. The apparatus as claimed in claim 2, including a second means for protecting, located on said opposite surface of said board between said contact surface and said means for connecting.

4. The apparatus as claimed in claim 1, wherein said means for protecting is of insulating material.

5. The apparatus as claimed in claim 1, wherein said means for protecting has a sealing edge disposed adjacent said contact surface.

6. The apparatus as claimed in claim 5, wherein said sealing edge is formed by pressing a tool against a surface of said means for protecting using a wedging method to flow-form said sealing edge.

7. The apparatus as claimed in claim 1, including a plurality of said contact means and wherein said means for protecting extends across said plurality of contact means.

8. The apparatus as claimed in claim 1, wherein said means for connecting is joined to said conducting path by solder.

9. The apparatus as claimed in claim 2, wherein said both ends of said strip are stiffened by deforming said ends.

10. The apparatus as claimed in claim 9, wherein said both ends of said strip have a V-shaped cross-section.

11. The apparatus as claimed in claim 9, wherein said both ends of said strip are twisted together.

12. The apparatus as claimed in claim 2, wherein one of said ends of said strips has a prolongation extending past the other end, said prolongation being folded back upon said other end.

References Cited

UNITED STATES PATENTS

| | | | |
|---|---|---|---|
| 2,993,188 | 7/1961 | Anderson | 339—17 LC |
| 3,336,561 | 8/1967 | Whiting | 339—17 R |

FOREIGN PATENTS

| | | | |
|---|---|---|---|
| 233,970 | 5/1961 | Australia | 339—17 LC |
| 1,060,004 | 6/1959 | Germany | 339—17 L |
| 1,081,098 | 5/1960 | Germany | 339—17 LC |
| 720,950 | 11/1965 | Canada | 339—176 MP |
| 292,035 | 7/1965 | Netherlands | 339—17 LC |

MARVIN A. CHAMPION, Primary Examiner

T. P. LEWIS, Assistant Examiner

U.S. Cl. X.R.

339—95 R, 176 MP, 195 M, 196 M, 256 R